No. 735,772. PATENTED AUG. 11, 1903.
A. G. INGALLS.
ATTACHMENT FOR FURNACES, &c.
APPLICATION FILED OCT. 6, 1902.
NO MODEL.
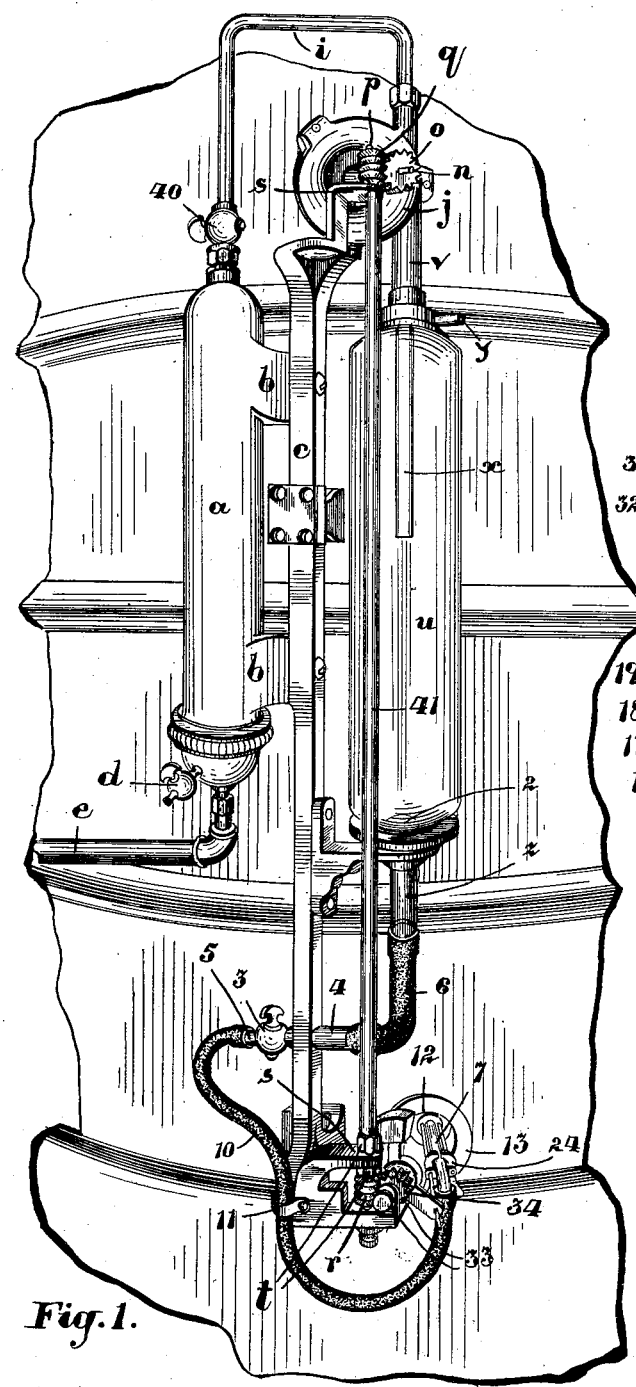
Fig. 1.
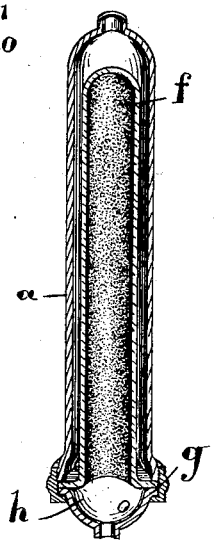
Fig. 3.
Fig. 4.
Fig. 5.
Fig. 6.
Fig. 2.
Fig. 7.
Witnesses.
J. Ell Blackmore
K. J. Trotter
Inventor.
Allen Gardiner Ingalls
by Fred B. Fetherstonhaugh
Atty.

No. 735,772.

Patented August 11, 1903.

UNITED STATES PATENT OFFICE.

ALLEN GARDINER INGALLS, OF MONTREAL, CANADA.

ATTACHMENT FOR FURNACES, &c.

SPECIFICATION forming part of Letters Patent No. 735,772, dated August 11, 1903.

Application filed October 6, 1902. Serial No. 126,221. (No model.)

*To all whom it may concern:*

Be it known that I, ALLEN GARDINER INGALLS, a subject of the King of Great Britain, residing at Montreal, in the District of Montreal, Province of Quebec, Canada, have invented certain new and useful Improvements in Attachments for Furnaces and the Like, of which the following is a specification.

My invention relates to attachments to furnaces and the like; and the object of the invention is to devise an appliance by means of which water will be automatically fed to a fire in a filtered state and in such a manner as to cause it to assume its spheroidal form on reaching an incandescent bed of fuel and whereby the consumption of ordinary fuel will be lessened materially in the provision of the supplemental fuel-water in its spheroidal form; and it consists, essentially, of a plurality of vessels attached to the side of a heater, through which a continuous stream of water is designed to flow, a minute water-wheel introduced between said vessels, a nozzle suitably connected to one of the said vessels and projecting through the furnace-wall, a frame designed to hold the said nozzle, and suitable means for transmitting power from the water-wheel to impart a twirling motion to the nozzle, the various parts being constructed in detail as hereinafter more particularly described.

Figure 1 is a perspective view of my device attached to the side of a furnace-wall. Fig. 2 is a sectional view of the filter vessel. Fig. 3 is a sectional view of the water-wheel and casing. Fig. 4 is a detail of the counterpoise-weights, nozzle, and frame. Fig. 5 is a sectional view of the swivel arrangement of rings. Fig. 6 is a sectional view of the adjustable and pivotal points. Fig. 7 is a detail of the alternative form of frame and nozzle.

Like characters of reference indicate corresponding parts in each figure.

$a$ is the filter vessel, and $b$ the brackets attaching said filter vessel to the frame $c$.

$d$ is a flushing-cock located to the lower end of the filter vessel $a$.

$e$ is a pipe connecting the filter vessel to the main water-supply.

$f$ is a porous-clay lining loosely fitting in the filter vessel $a$ and closed at the top and open at the bottom and resting on the projecting ledge $g$ of the base $h$ of the said filter vessel $a$.

It will be seen that any water entering the filter vessel $a$ through the pipe $e$ must first pass up into the interior of the porous-clay lining $f$ and from there penetrate through the said lining at the sides and top into the filter vessel $a$.

$i$ is a pipe leading from the filter vessel $a$ to the water-wheel casing $j$, being connected with the latter by a very minute opening $k$.

$l$ is a water-wheel having the paddles $m$ designed to rotate the shaft $n$, which turns in suitable roller-bearings.

$o$ is a worm-wheel keyed to the shaft $n$ outside the casing $j$.

$p$ is a rod having the worm $q$ at its upper end and the worm $r$ at its lower end and turning in the brackets $s$ from the frame $c$.

The rod $p$ is provided with the rings or nuts $t$ above and below the lower bracket $s$.

$u$ is a transparent receptacle connected by means of the pipe $v$ to the casing $j$.

$x$ is a pipe leading down through the pipe $v$ from the exhaust-opening $w$ into the interior of the receptacle $u$.

$y$ is an overflow-pipe through the top of the receptacle $u$.

The exhaust-water from the casing $j$ drips down the central pipe $x$ into the interior of the receptacle $u$.

$z$ is the reduced lower end of the receptacle $u$ and is provided with the orifice 2 at the bottom thereof.

3 is a cock secured to the frame $c$ and provided with the projecting pipes 4 and 5 from each side.

6 is a tube connecting the reduced lower end $z$ with the pipe 4, leading through the cock 3.

7 is a nozzle having a lava-tipped point 8, provided with very minute orifices 9, designed to direct water in various directions.

10 is a flexible tube designed to connect the pipe 5, leading from the cock 3 and the nozzle 7, and is supported from the frame intermediate of its length by the staple 11.

12 is an orifice in the furnace-wall above the fire, having the stationary ring 13 inserted therein.

14 represents screws having the lava tips 15 tapering to a point.

The screws 14 are designed to be inserted through the ring 13 diametrically opposite one to the other and pointing inwardly toward the center of the ring.

16 is a ring provided with pivotal-point bearings 17, designed to receive the lava tips 15.

18 represents screws also provided with lava tips 19, tapering to a point and inserted through the ring 16 diametrically opposite one to the other and pointing inwardly toward the center of the ring.

20 is a ring provided with the pivotal-point bearings 21, designed to receive the lava tips 19.

22 and 23 are rods inserted into orifices diametrically opposite one to the other in the edge of the ring 20.

24 is a spring-clip designed to hold the nozzle 7 in position between the rods 22 and 23 and having orifices 25 and 26 for the rods 22 and 23 to pass through. The rod 23 terminates at the outer edge of the orifice 26, and the rod 22 passes through the orifice 25 and extends rearwardly. It will be thus seen that a tube or nozzle inserted in the central orifice formed by the ring 20 may be given an oscillatory motion through the swivelly-arranged rings 16 and 20.

27, 28, and 29 are arms projecting from a common hub 30, and 31 represents counterpoise-weights terminating the arms 27 and 28.

The arm 29 is provided with an orifice 39, designed to loosely hold the extension of the rod 22.

32 is a shaft journaled in the brackets 33 from the lower end of the frame c.

34 is a worm-wheel securely keyed to the shaft 32 and designed to mesh with the worm r. The hub 30 is also securely keyed to the shaft 32.

The nozzle 7, when held to the rod 22, has its nose or tip 8 projecting through the ring 20 into the interior of the fire-box. The rod 22 also at its inner end is inserted in an orifice in the said ring 20.

It must be here understood that I may adopt other methods of holding the nozzle. For instance, as shown in Fig. 7, I have provided a ring 35, having a set-screw 36 inserted diametrically therethrough and orifices 37 and 38 designed to receive the rods 22 and 23, the latter rod terminating in the rings 35 and 20 and the rod 22 extending through the arm 29, as aforesaid. In this method the nozzle is inserted through the ring 35 and similarly, as described, through the ring 20. The set-screw 36 is then screwed down firmly against the said nozzle in order to prevent any motion of the said nozzle other than that imparted to it through the rods 22 and 23.

It will be noticed from the foregoing that the rotatory motion of the hub 30, and consequently the arm 29, will affect the nozzle 7 because of the rod 22 being held loosely in the orifice 39. Thus an oscillatory motion will be communicated to the point of the nozzle on the turning of the shaft 32, which is operated through its worm-and-wheel connection with the rod $p$.

40 is a valve placed, if desirable, at the outlet of the filter vessel and is designed to control the egress of water.

The rod $p$ is preferably provided with a stationary casing 41.

Having described the various parts involved in my invention, I shall now more particularly explain the operation thereof.

The water is turned on from the main water-supply and is allowed to flow through the pipe $e$ to the interior of the porous-clay lining $f$. The water penetrates the porous lining through the sides and top thereof and fills the filter vessel $a$. The water is now in a filtered state, and it passes on up through a suitable opening at the top of the filter vessel $a$ into the pipe $i$, and flowing on through the said pipe the water enters the water-wheel casing through the minute opening $k$. This causes a very fine jet of water to enter which impinges against the paddles $m$. The continuous impinging of water through the orifice $k$ upon the paddles $m$ causes them, and consequently the water-wheel, to rotate in the interior of the casing $j$. The rotation of the water-wheel $l$ turns the shaft $n$, which causes the worm-wheel $o$ to revolve. The worm-wheel $o$, meshing with the upper worm $q$, operates the rod $p$, which in turn, as before explained, operates the worm-wheel 34 through the meshing of the latter with the worm $r$. The revolving of the worm-wheel 34 turns the shaft 32, and as the hub 30 is securely fixed thereon the arms 27, 28, and 29 rotate therewith. The rod 22 is loosely held in the orifice 39 in the arm 29 at one end and at the other in the ring 20. Consequently in the rotation of the arm 29 the rearward end of the nozzle is carried with it, the counterpoise-weights 31 being provided to balance the weight of the said frame. The rearward end of the nozzle rotating with the arm 29 causes a twirling motion to the point of the nozzle, which is, as herein explained, held securely to the rod, and as the point of the nozzle thus moves the rings 16 and 20 move with it in any direction because of the rightangular pivotal arrangement of the same practically holding the tip of the nozzle in a swivel arrangement of rings. The water which has been spurting into the casing $j$ must have an outlet, and this is provided in the exhaust-opening $w$. The water exhausts through this opening into the pipe $x$, which carries it down into the interior of the receptacle $u$. The cock 3 is turned so as to cut off the passage of water therethrough, and thus allow the receptacle $u$ to fill up to a desired level, and so soon as this level has been reached the cock 3 is opened and the water allowed to pass therethrough from the receptacle $u$ down through the tube 6 into the nozzle 7, finding egress therefrom through the minute orifices 9. It is scattered in varying directions in the fire-box, guided by the oscillatory motion of the tip of the nozzle and the angular arrangement of the orifices 9 one to the other. The escape of water through the orifices 9 in the nozzle 7 is designed to be equal to the ingress of water to the receptacle $u$ from the exhaust of the water-wheel chamber, a certain water-level being maintained in the receptacle $u$, which practically serves the purpose of a gage. The water exhausting from the casing $j$ will thus find its way to the fire-box, in which it is proposed to have an incandescent bed of fuel. The twirling motion of the tip of the nozzle sends this water into the fire in such a manner as to cause it to separate in minute globules. These globules fall to the incandescent bed of fuel and there suspend in spheroidal form. The water in its spheroidal form wastes away into $H_2O$ gas and is consumed by the fire, thus supplementing the fuel already in the fire-box and causing a very great increase in the generation of heat from the fire.

The regulation of this device is a very important matter, which needs a little care at first to ascertain exactly to what level the water must be maintained in the receptacle $u$. Upon ascertaining this fact the subsequent care is practically nothing, as the machine will automatically govern itself, only requiring the one stream of water, which can be obtained from the main water-supply.

What I claim as my invention is—

1. In attachments to furnaces and the like, the combination with the fire-box in a furnace, of a tube provided with a nozzle, protruding through an orifice located above the fire-box, an intermediate water vessel connecting the main water-supply with the tube, and automatic means for twirling the tip of the nozzle, as and for the purpose specified.

2. In attachments to furnaces and the like, the combination with the fire-box in a furnace, of a tube provided with a nozzle, protruding through an orifice located above the fire-box, an intermediate water vessel connecting the main water-supply with the tube, an adjustable valve controlling the outlet from the said water vessel, and automatic means for twirling the tip of the nozzle, as and for the purpose specified.

3. In attachments to furnaces and the like, the combination with the fire-box in a furnace, of a tube provided with a lava-tipped nozzle protruding through an orifice located above the fire-box, a filtering vessel intermediate of the main water-supply and the tube, and automatic means for twirling the tip of the nozzle, as and for the purpose specified.

4. In attachments to furnaces and the like, the combination with the fire-box in a furnace, of a tube, a lava-tipped nozzle connected to the same and protruding through an orifice above the fire-box, a filtering vessel intermediate of the main water-supply and the tube, an adjustable valve controlling the outlet from the said filter, a water-wheel located between the filtering-chamber and the said tube and communicating therewith, a worm-and-gear transmission to the nozzle from said water-wheel, as and for the purpose specified.

5. In attachments to furnaces and the like, the combination with the fire-box in a furnace, of a tube provided with a nozzle protruding through an orifice located above the fire-box, a filtering vessel connected at one end with the main water-supply, and at the other communicating with a water-wheel chamber, an adjustable regulating-valve controlling the outlet from the said vessel, a water-wheel, an exhaust-opening from the water-wheel chamber, a regulating-receptacle having the tube connected to its lower end, and means of transmitting power from the water-wheel to the nozzle to rotate it, as and for the purpose specified.

6. In attachments to furnaces and the like, the combination with the fire-box in a furnace, of a tube having a nozzle at the end thereof, protruding into an orifice located above the fire-box and resting in swivelly-pivoted rings therein, a suitable frame supporting said nozzle, a filtering vessel having a suitable flushing-cock at its lower end and connected to the main water-supply, a water-wheel chamber having outlet and exhaust openings, a pipe connecting the filtering vessel with the water-wheel chamber, a plurality of arms projecting from a common hub and keyed to a worm-wheel, and designed to carry in their revolutions one end of the nozzle-supporting frame, a worm-and-gear transmission to the same, as and for the purpose specified.

7. In attachments to furnaces and the like, the combination with the fire-box in a furnace, of a tube terminating in a nozzle protruding into an orifice located above the fire-box, supported in swivelly-arranged rings therein, a filtering vessel connected with the main water-supply, an inclosed communicating passage leading to a water-wheel chamber having a very minute entrance-orifice, a water-wheel, a rod having a worm at the top and at the bottom, a plurality of worm-wheels meshing therewith, a plurality of arms revolving with the worm-wheel, one of said arms being designed to carry the nozzle-supporting frame, and the others being provided with counterpoise-weights, as and for the purpose specified.

8. In a device of the class described, in combination, a furnace provided with a suitable fire-box, and having an orifice in the wall located above the fire-box, a filtering-water vessel having an inlet and outlet, a water-wheel suitably incased and having connection with the said filter vessel by a suitable passage, a tube connected with the exhaust-opening of the water-wheel chamber, a suitable water-gage, a nozzle terminating the said tube and swivelly arranged in the orifice in the wall of the furnace, means of transmitting power from the water-wheel, and a plurality of revolving arms designed to impart a twirling motion to the tip of the nozzle, as and for the purpose specified.

9. In a device of the class described, in combination, a furnace provided with a suitable fire-box, and having an orifice in the wall located above the fire-box, a nozzle swivelly arranged in said orifice, a filtering vessel connected with the water-main and designed to supply water to the said nozzle, and automatic means for twirling the tip of the nozzle, as and for the purpose specified.

10. In a device of the class described, in combination, a furnace provided with a suitable fire-box, and having an orifice in the wall located above the fire-box, a nozzle designed to protrude through the said orifice, a filtering vessel connected with the water-main, a water-wheel in the passage of the water from the said filtering vessel, a pipe terminating in the nozzle and leading from the water-wheel exhaust, a vessel forming a water-gage, and suitable connections from the water-wheel to the nozzle to impart to the latter a twirling motion, as and for the purpose specified.

11. In a device of the class described, a furnace provided with a suitable fire-box and having an orifice in the wall thereof, a frame having projecting brackets at its upper and lower ends, a supply-pipe filter, a water-chamber supported from the said frame and suitably connected to the supply-pipe filter, and having a reduced lower end, a nozzle in said orifice, a pipe connecting the reduced lower end of the water-chamber with the nozzle, a cut-off intermediate of its length, a staple suitably attached to the frame, and designed to support the tube toward its lower end, and means for imparting a twirling motion to the nozzle, as and for the purpose specified.

12. In a device of the class described, in combination, a furnace provided with a suitable fire-box, and having an orifice in the wall located above the fire-box, a frame having brackets at its upper and lower ends and attached to the wall of the said furnace, a supply-pipe filter, a water-chamber supported by the frame and suitably connected to the supply-pipe filter, a nozzle swivelly arranged in said orifice, a rod designed to be held stationary at its one end, and to be carried in a rotatory motion at its other end, a spring-clip designed to hold the nozzle to the said rod, and means for supporting the rod and imparting to it a rotatory motion, as and for the purpose specified.

13. In a device of the class described, a swivel arrangement of rings supported one within the other by lava-tipped pivotal points in bearings located in pairs at right angles, as and for the purpose specified.

14. In a device of the class described, in combination, a furnace, a nozzle having connection with a suitable water-supply, a stationary ring inserted in an orifice in the wall of a furnace, a plurality of inner rings one within the other supported by pivotal points in bearings arranged in pairs at right angles, and means for imparting a twirling motion to the nozzle, as and for the purpose specified.

Signed at Montreal, in the District of Montreal, in the Province of Quebec, Canada, this 4th day of October, 1902.

ALLEN GARDINER INGALLS.

Witnesses:
J. E. L. BLACKMORE,
R. T. TROTTER.